(12) United States Patent
Sarh et al.

(10) Patent No.: US 7,789,343 B2
(45) Date of Patent: Sep. 7, 2010

(54) MORPHING AIRCRAFT WITH TELESCOPIC LIFTING AND CONTROL SURFACES

(75) Inventors: Branko Sarh, Huntington Beach, CA (US); David J. File, Lawrence, KS (US)

(73) Assignee: The Boeing Company, Chicago, IL (US)

( * ) Notice: Subject to any disclaimer, the term of this patent is extended or adjusted under 35 U.S.C. 154(b) by 394 days.

(21) Appl. No.: 11/782,456

(22) Filed: Jul. 24, 2007

(65) Prior Publication Data

US 2009/0026321 A1    Jan. 29, 2009

(51) Int. Cl.
     *B64C 3/38*    (2006.01)
(52) U.S. Cl. ......................................... 244/46; 244/45 A
(58) Field of Classification Search ................. 244/218, 244/46, 47, 99.11, 201, 3.27, 3.28, 3.29
     See application file for complete search history.

(56) References Cited

U.S. PATENT DOCUMENTS

| | | | |
|---|---|---|---|
| 1,772,815 A | 8/1930 | Mandrich | |
| 1,982,242 A | 11/1934 | Bellanca | |
| 2,038,337 A | 4/1936 | Ballman | |
| 2,056,188 A | 10/1936 | Hayden | |
| 2,076,059 A | 4/1937 | Asbury | |
| 2,249,729 A | 7/1941 | Fitzurka | |
| 2,260,316 A | 10/1941 | Harris | |
| 2,292,613 A | 8/1942 | Chapman | |
| 2,344,044 A | 3/1944 | Koch | |
| 2,420,433 A | 5/1947 | Kraaymes | |
| 2,423,095 A | 7/1947 | Gibson | |
| 2,487,465 A | 11/1949 | Murray | |
| 2,550,278 A | 4/1951 | Makhonime | |
| 2,743,072 A | 4/1956 | Emmi | |
| 2,858,091 A | 10/1958 | Kapenkin | |
| 3,162,401 A * | 12/1964 | Hopwood | 244/207 |
| 3,672,608 A | 6/1972 | Gioia et al. | |
| 3,680,816 A * | 8/1972 | Mello | 244/46 |
| 4,181,277 A * | 1/1980 | Gerhardt | 244/218 |
| 4,691,881 A | 9/1987 | Gioia et al. | |
| 4,824,053 A * | 4/1989 | Sarh | 244/218 |
| 4,986,493 A * | 1/1991 | Sarh | 244/2 |
| 6,394,397 B1 | 5/2002 | Ngo et al. | |
| 6,588,709 B1 | 7/2003 | Dunne et al. | |
| 6,910,661 B2 | 6/2005 | Dockter | |
| 7,195,210 B2 | 3/2007 | Hamilton et al. | |
| 2009/0206192 A1 * | 8/2009 | Sanderson et al. | 244/3.27 |

* cited by examiner

*Primary Examiner*—Timothy D Collins
*Assistant Examiner*—Michael Kreiner
(74) *Attorney, Agent, or Firm*—Haynes & Boone, LLP.

(57) ABSTRACT

A morphing aircraft includes a lifting body and a telescopic lifting or control surface, such as a wing, coupled to the lifting body. The lifting surface is deployable between extended and retracted positions relative to the lifting body and configured such that, when disposed in the extended position, the flight characteristics of the aircraft correspond to those of a low-speed, high-lift aircraft, and when disposed in the retracted position, the flight characteristics of the air-craft correspond to those of a high-speed, low-lift aircraft, the lifting surface is disposed entirely within the lifting body, and an outboard end surface of the lifting surface blends continuously into an outer mold line surface of the lifting body.

12 Claims, 8 Drawing Sheets

MORPHING AIRCRAFT WITH TELESCOPIC LIFTING AND CONTROL SURFACES

BACKGROUND

This disclosure relates to aircraft in general, and in particular, to morphing aircraft having a deployable lifting surface, such as a wing, that is laterally extendable and retractable relative to a main aircraft lifting body, and which, when retracted, fairs smoothly into the outer mold line surface of the main body and thereby imparts low-aspect-ratio, high-speed aerodynamic characteristics to the aircraft, and when extended, imparts high-aspect-ratio, low-speed aerodynamic characteristics to the aircraft.

It has long been recognized that fixed wing aircraft have limitations as regards to their operational capabilities, performance, mission flexibility, and mission durations. Accordingly, efforts have been made to develop more versatile products to better meet existing and even more demanding future manned and unmanned mission requirements of, e.g., unmanned combat air vehicles (UCAV). One such effort is the development of so-called "morphing aircraft," i.e., air-craft with the ability to adapt and optimize their shape to achieve dissimilar, multi-objective mission roles efficiently and effectively.

Over the years, several morphing aircraft concepts have been developed and used to accommodate both low and high speed mission requirements. One type of production aircraft configuration found in, e.g., the Grumman F-14 "Tomcat" and the General Dynamics F-111B "Aardvark," involves a variable sweep wing, movable between a forward sweep position for low speed operations and an aft sweep position for high speed operation.

However, prior solutions that use a swept wing change the location of the center of lift (CL) with respect to the vehicles' longitudinal axis, and hence, its center of gravity (CG). The sweeping action moves the resultant lift of the aircraft along the aircraft's longitudinal axis, thereby adversely impacting the aerodynamic stability of the aircraft, which then must be compensated for by activating flight control surfaces, resulting in an increase in drag or by moving weight (such as fuel) from one location to another. Also, since the wing remains external to the vehicle's fuselage, the wing always provides some lifting surface regardless of its position. Thus, the wetted area of a variable swept-wing aircraft remains approximately the same in the swept and un-swept configurations, thereby generating relatively high drag even during high speed operations.

Another morphing aircraft configuration uses a partially vertically folded wing to reduce lift-generating wing area during high speed operations. However, since all wing surfaces are still exposed to airflow and the wetted area of the wing remains approximately the same for both low and high speed configurations, unnecessary and wasteful drag is generated at high speeds.

Still another aircraft configuration currently under development employs a variable wing shape configuration, using multiple actuators and flexible wing skins to change the sweep and chord depth of the wing. However, this arrangement requires extensive kinematics, greatly increasing the complexity, weight and associated costs to manufacture, maintain and operate the aircraft.

Another prior solution is described in U.S. Pat. No. 5,645,250 to D. Gevers. In this instance, the span of a wing attached to a fuselage is extended to lengthen an existing wing. This solution does not provide the desirable transition from high-aspect-ratio, low-speed aerodynamic characteristics to low-aspect-ratio, high-speed aerodynamic characteristics necessary to perform a multi objective missions.

SUMMARY

A morphing aerial vehicle is disclosed that has the ability to transform its flight characteristics between those of a high aspect/low speed aircraft (such as the Northrop Grumman "Global Hawk" UAV), and a low aspect ratio/high speed aircraft (such as the Lockheed F-117A "Nighthawk"). By incorporating deployable/retractable telescopic lifting and/or control surfaces, such as telescopic wings, to a lifting body aircraft, the novel morphing aircraft is thereby made capable of fulfilling two very different mission requirements: First, with the wings deployed from the body (and thereby generating a greater lifting surface), the vehicle is capable of low speed flight and is operable for extended periods of time at such speeds; second, with the wings retracted, the vehicle is capable of high subsonic or supersonic speeds. This morphing aircraft is therefore capable of carrying out two distinctly different missions: 1) a long range, long endurance reconnaissance mission, and 2) a high speed attack mission, by alteration of aerodynamic surfaces of the aircraft (viz., its wings). This wing morphing capability enables the aircraft to operate effectively both at high speeds (i.e., using the small lifting surfaces of the aircraft body and minimizing drag), and at very low speeds with a deployed telescopic wing (using large lifting surfaces/optimized lift, reduced fuel consumption, better mission endurance).

In one exemplary embodiment, an aircraft comprises a lifting body and a telescopic surface coupled to the lifting body. The surface is deployable between extended and retracted positions relative to the lifting body and configured such that, when disposed in the extended position, the flight characteristics of the aircraft correspond to those of a low-speed, high-lift aircraft, and when disposed in the retracted position, the flight characteristics of the aircraft correspond to those of a high-speed, low-lift aircraft, with the telescopic surface being disposed entirely within the lifting body, and an outboard end surface of the surface blending continuously into an outer mold line (OML) of the lifting body.

In another exemplary embodiment, a telescopic aircraft wing comprises a plurality of elongated airfoil segments that are moveable laterally, or span-wise, with respect to each other. Each airfoil segment has opposite inboard and outboard ends and comprises an outer skin, a rib disposed inside the skin at the inboard end thereof, a pair of fore and aft spar segments extending laterally between the inboard and outboard ends thereof, and a mechanism disposed adjacent to at least one of the inboard and outboard ends for slidably supporting the at least one end thereof relative to an adjacent airfoil segment, and wherein the airfoil segments and respective ones of the fore and aft spar segments nest concentrically within each other when the lifting surface is disposed in a retracted position.

A better understanding of the above and many other features and advantages of the novel telescopic lifting surface aircraft may be obtained from a consideration of the detailed description below of some exemplary embodiments thereof, particularly if such consideration is made in conjunction with the appended drawings, wherein like reference numerals are used to identify like elements illustrated in one or more of the figures thereof.

DETAILED DESCRIPTION

Figure 1A:
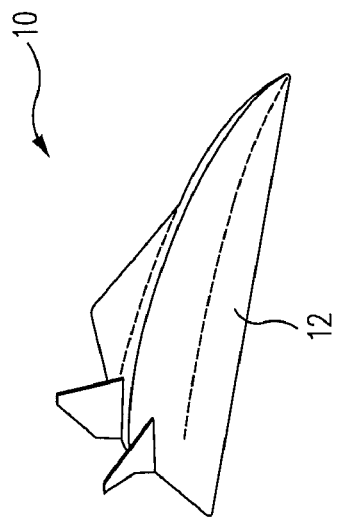
FIGS. 1A and 1B are upper right side perspective views of an exemplary embodiment of a lifting body type of aircraft incorporating a pair of telescopic wings, showing the wings in the fully deployed and fully retracted positions, respectively.
Figure 1B:
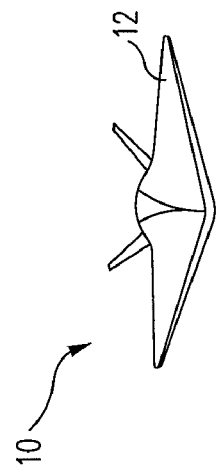
Figure 1C:
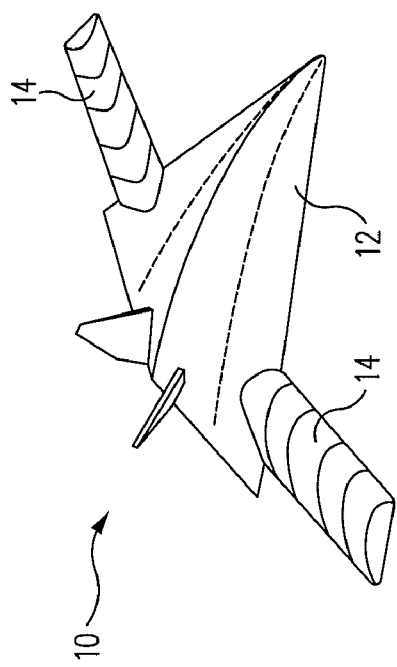
FIGS. 1C and 1D are head-on perspective views of the exemplary aircraft of FIG. 1, respectively showing the telescopic wings in the fully deployed and retracted positions.
Figure 1D:
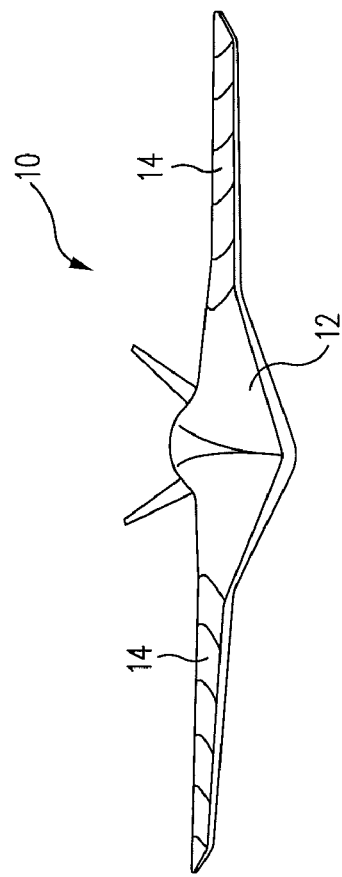

FIGS. 1A and 1B are upper right side perspective views of an exemplary embodiment of an of aircraft 10 incorporating a lifting body 12 and a pair of telescopic wings 14, showing the wings in the fully deployed position and fully retracted position, respectively, and FIGS. 1C and 1D are head-on perspective views of the same aircraft respectively showing the wings deployed and retracted.

In one embodiment, the exemplary wing-morphing aircraft 10 is capable of carrying out two distinctly different missions: 1) a long range, long endurance, reconnaissance mission, and 2) a high speed attack mission, by alteration of aerodynamic surfaces of the aircraft (viz., by elongation and contraction of its wings 12). This wing morphing capability enables the aircraft to operate effectively both at high speeds, i.e., using the small lifting surfaces of the aircraft body alone and thereby minimizing drag, and also at very low speeds with the telescopic wings deployed (i.e., using the increased lifting surfaces/optimized lift provided thereby, along with reduced fuel consumption and better mission endurance.

By incorporating deployable, span-wise lifting surfaces into a high speed lifting body aircraft 10 of the type illustrated in FIGS. 1A-1D, the aircraft is effectively enabled to change its shape advantageously, and hence, change the performance of the aircraft from an optimal high speed subsonic/supersonic configuration to an optimal low speed subsonic configuration.

In a further embodiment, the telescopic wings 14 are coupled to structure located within the internal volume of the aircraft body 12 and moveable relative thereto such that, when they are fully retracted, they are completely enclosed within the body, and their distal ends 16 fair smoothly into the outer mold line (OML) surface of the body in a streamlined manner, as illustrated in FIGS. 1B and 1D. The aircraft body 12 itself is a lifting surface, such as those found in, e.g., a blended wing body (BWB) aircraft, such as the Boeing X48B experimental aircraft, or a delta-wing-body aircraft, such as the Lockheed SR-71 "Blackbird." When retracted, the wings blend into the streamlined aerodynamic shape of the aircraft body 12, i.e., the interface between the wings and the surface of the body is minimized such that there is a continuous outer mold line of the body. Another way to describe this is that the distal ends 16, or the most outboard segments of, the deployable wings 14 each comprises a surface that completes the outer mold line surface of the lifting body 12 when the wings are disposed in the fully retracted position.

Figure 2:
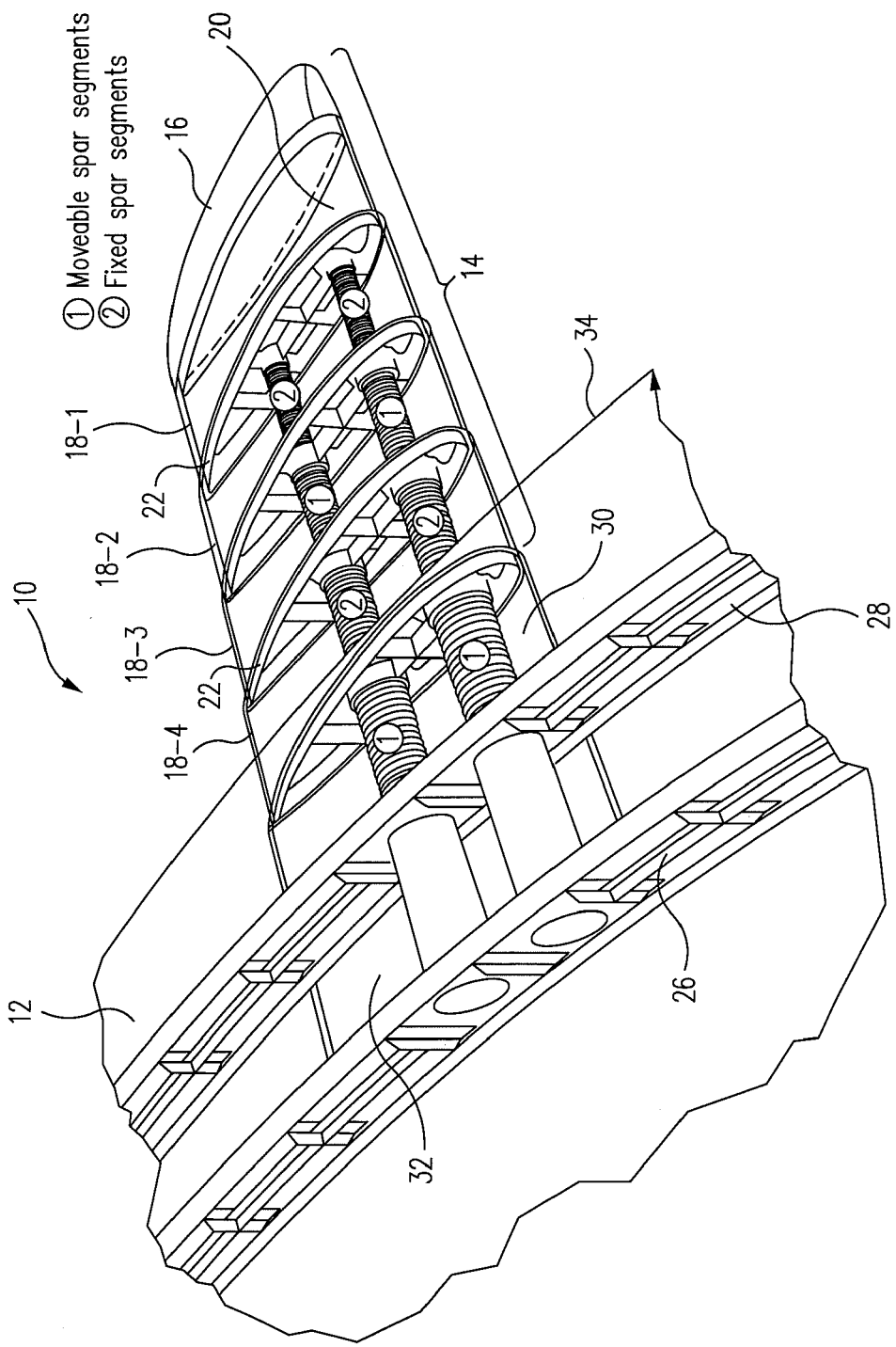
FIG. 2 is a partial breakaway perspective view of another exemplary embodiment of a lifting body aircraft incorporating a telescopic wing in a deployed condition, showing the integration of the wing with the body of the aircraft and selected structural details thereof.
Figure 3:
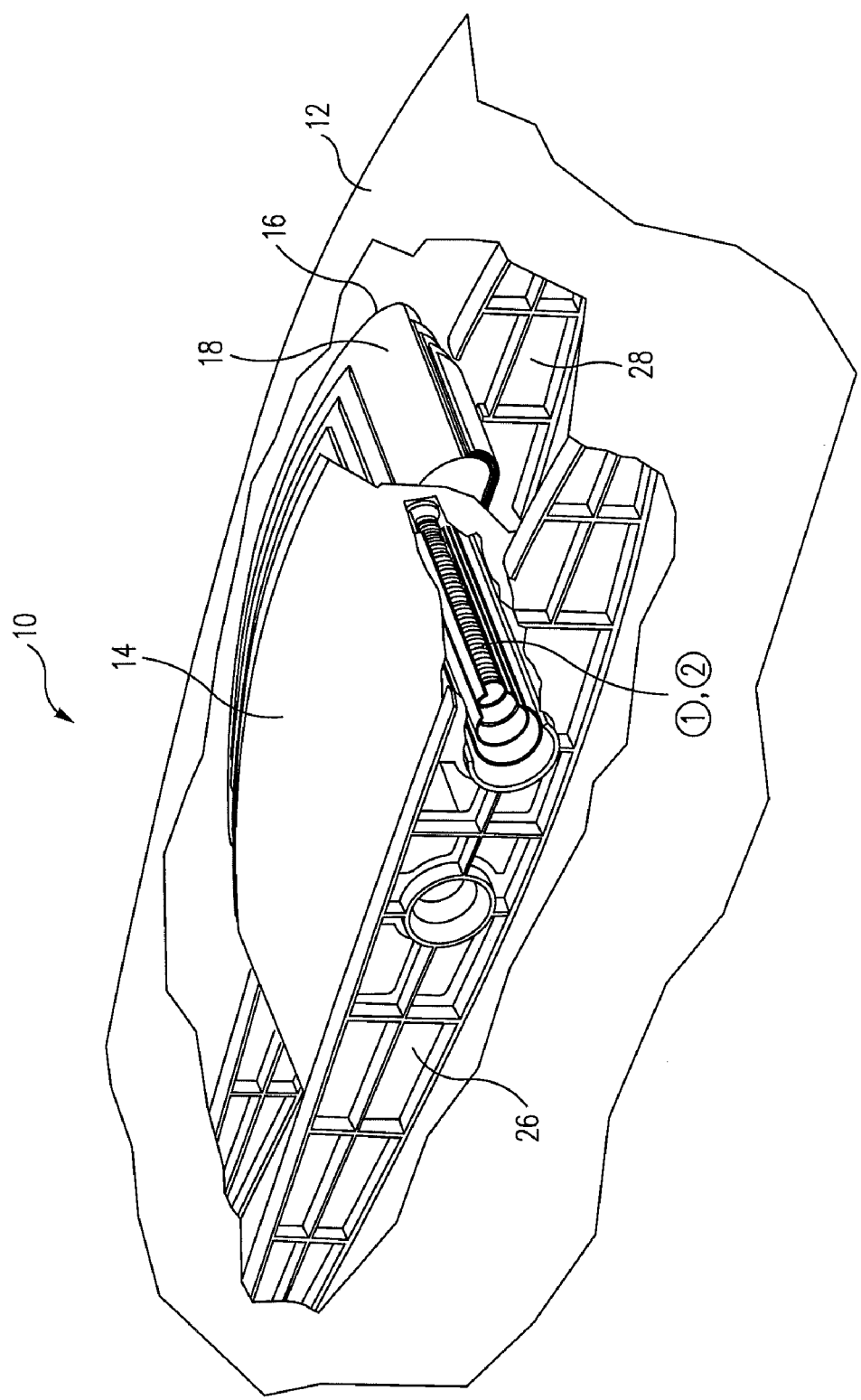
FIG. 3 is a view similar to FIG. 2, showing the telescopic wing fully retracted and having a distal end fairing smoothly with the external mold line surface the aircraft body.

FIGS. 2 and 3 are partial breakaway perspective views of an exemplary embodiment of an exemplary telescopic wing 14 of a type that may be used in the exemplary lifting body aircraft 10 of FIGS. 1A-1D, and illustrate the wing in the deployed and retracted conditions, respectively. In the particular embodiment illustrated, the exemplary wing 14 is divided into multiple airfoil segments 18-1-18-$n$ to reduce storage space requirements within the aircraft body 12 in the retracted condition. As those of skill in the art will appreciate, the number n of segments 18 can vary, depending on the particular application at hand. Each segment 18 of the exemplary wing comprises a skin 20, a rib 22, and a pair of laterally extending fore and aft spar segments that nest concentrically within each other when the wing is in the retracted position, as illustrated in FIG. 3, and comprise either moveable ① or fixed ② spar segments, respectively. In the exemplary embodiment illustrated, these spar segments operate in combination with each other in a manner similar to that described in U.S. Pat. No. 4,824,053 to B. Sarh, incorporated herein by reference, to provide the motions and forces necessary to deploy and retract the wing 14 smoothly and efficiently, even during flight. As discussed in more detail below in connection with FIG. 4, the nesting spar segments 18 are operably coupled to each other and the ribs 22 by means of recirculating balls 24 and bushings that carry loads in all six degrees of freedom (i.e., forces $F_X$, $F_Y$ and $F_Z$ and moments $M_X$, $M_Y$ and $M_Z$). Thus, only one degree of rotational freedom is needed and utilized to fully deploy or retract the wing.

In another embodiment, the telescopic wing 14 is coupled to the main structural framework of the aircraft body 12 and attaches to inner and outer bulkheads 26 and 28 of the lifting body 12. The wing is thus capable of being stored entirely inside a wing storage compartment 30 within the body, occupying a minimal amount of space, and leaving the majority of the internal body volume available for, e.g., fuel tanks 32 or subsystems installations. The deployable portion of the wing is fully stowed in the storage compartment 20 between the outer bulkhead 28 and outer edge 34 of the lifting body 12 during high speed flight, as illustrated in FIG. 3, wherein the telescopic wing 14 is shown in the fully retracted position. The inner and outer bulkheads 26 and 28 anchor the inner end portions of the spar segments ① and ② to maintain structural integrity between the wing and the aircraft body. The remaining space between these two bulkheads can be used, e.g., for a fuel tank 32 volume, as discussed above and illustrated in FIG. 2.

Figure 4:
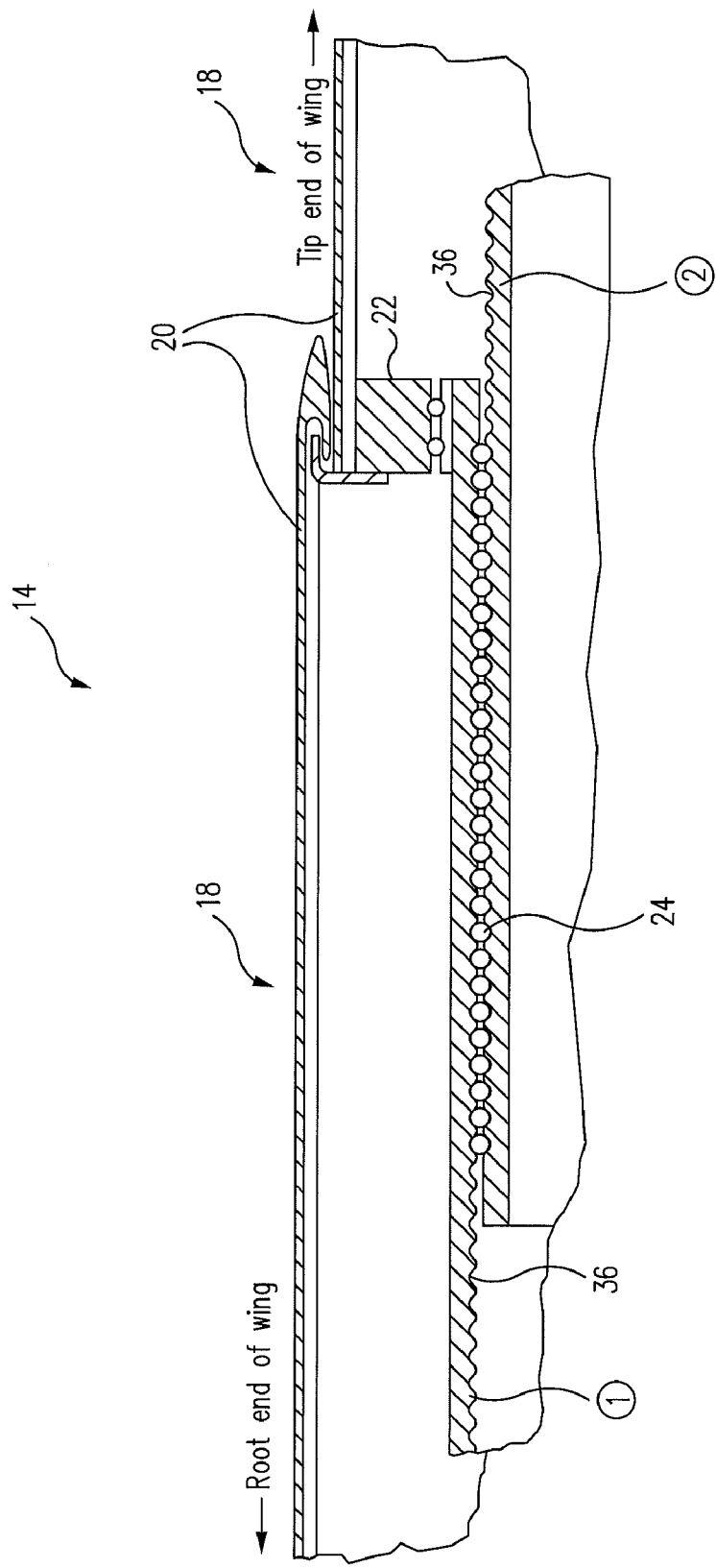
FIG. 4 is a partial cross-sectional front elevation view of the exemplary telescopic wing of FIGS. 2 and 3, showing an interface between rotating and non-rotating spar segments thereof that is effectuated in part by means of recirculating balls.

FIG. 4 is a partial cross-sectional front elevation view of the exemplary telescopic wing 14 of FIGS. 2 and 3, showing the interface between the concentrically disposed rotating and non-rotating spar segments ① and ② of each segment 18 thereof that is effected by means of the recirculating ball 24 arrangement illustrated. As illustrated in FIG. 4, each spar segment is arranged to telescope concentrically within the next adjoining spar segment and toward the root end of the airfoil. As illustrated in FIG. 2, alternating fore and aft pairs of spar segments ① are rotatable, and intermediate fore and aft spar segments ② are held stationary with respect to their corresponding segment, and with the end portions of adjacent spar segments overlapping each other. The spar segments include circumferentially opposing helical recirculating ball tracks 36 that couple the overlapping spar portions to each other. The tracks at opposite ends of each spar segment are of opposite chirality so that rotation of the rotatable spar segments ① causes the entire group of segments of the wing 14 to be drawn together into the wing storage compartment 30 in the lifting body 12 at the root end of the wing. In this way, the wing span can be reduced to less than 30% of the full span, while the wing spars retain their full load-carrying capability at each intermediate point during extension and retraction of the wing between its fully deployed and fully retracted positions. Of course, as those of skill in the art will appreciate, mechanisms other than recirculating ball systems can be used to deploy and retract the telescopic wing, and accordingly, the present invention should not be deemed as limited thereto.

Figure 5A:
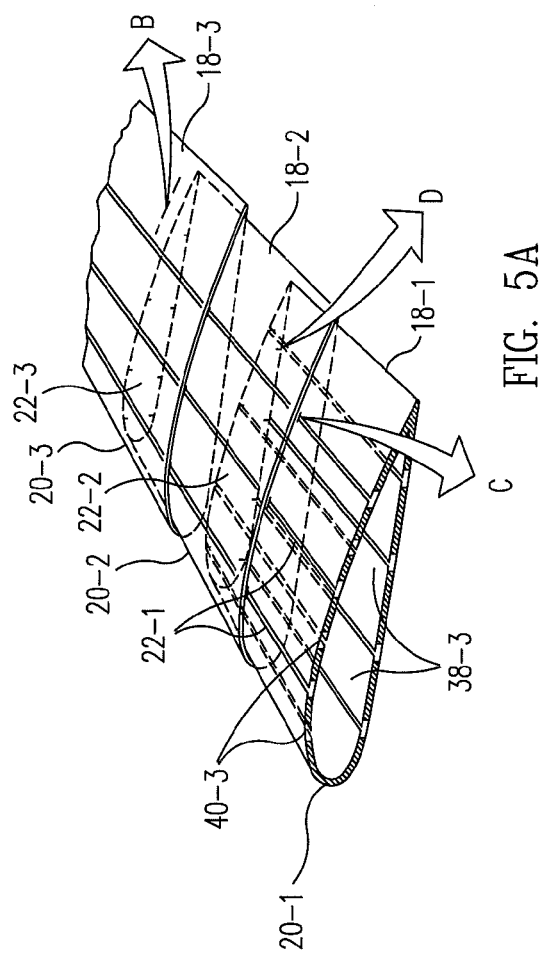
FIG. 5A is a partial upper and cross-sectional distal end view of the exemplary telescopic wing of FIGS. 2-4, showing the sliding skin segments of the wing, and from which various enlarged partial cross-sectional detail perspective views are taken.
Figure 5B:
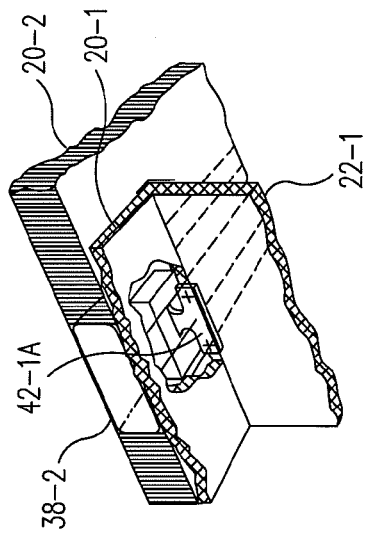
FIG. 5B is an enlarged partial cross-sectional detail perspective view of the exemplary wing of FIG. 5A as indicated by the arrow B therein, showing an upper inner internal sliding block and channel interface thereof.
Figure 5C:
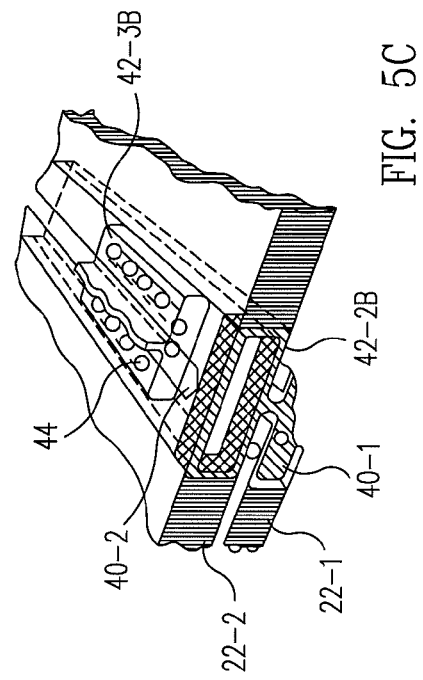
FIG. 5C is an enlarged partial cross-sectional detail perspective view of the exemplary wing of FIG. 5A as indicated by the arrow C therein, showing an external sliding block and channel interface thereof.
Figure 5D:
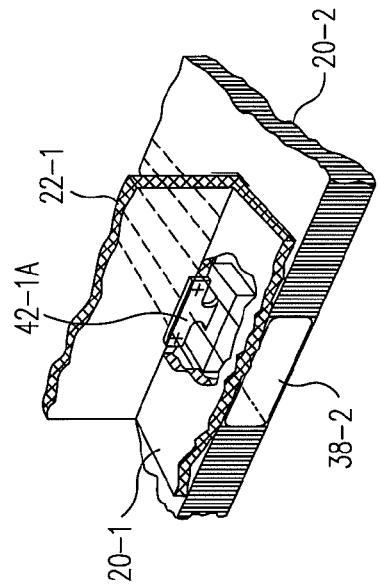
FIG. 5D is an enlarged partial cross-sectional detail perspective view of the exemplary wing of FIG. 5A as indicated by the arrow D therein, showing a lower internal sliding block and channel interface thereof.

As those of skill in the art will also appreciate, it is necessary to ensure that aerodynamic loads imposed on the skins 20 of the telescoping wing 14 are distributed uniformly over the wing and carried back efficiently to the structure of the lifting body 12 of the aircraft 10. FIGS. 5A-5D illustrate embodiments of the load-carrying sliding interfaces disposed between the respective upper and lower portions of the respective skins 20-$i$ of the wing segments 18-$i$ of the exemplary telescopic wing 14 of FIGS. 2-4, wherein FIG. 5A is a partial upper and cross-sectional distal, or outboard end view of the wing, showing the skin segments 20-1, 20-2, 20-3 of the respective wing segments 18-1, 18-2 and 18-3 and associated span-wise internally and externally opening C-shaped channels 38 and 40, and wherein FIGS. 5B-5D are enlarged partial cross-sectional detail perspective view of the wing of FIG. 5A respectively indicated by the arrow B, C, D, showing the respective sliding-block-and-channel interfaces thereof.

In particular, FIG. 5B illustrates the sliding interface located at the inner ends of each of the wing segments 18-$i$ except the innermost wing segment 18-$n$, comprising one of a plurality of sliding blocks 42-1A of the wing segment 18-1 that is fixedly coupled to an upper end of the wing segment's rib 22-1, which is located at the inboard end of the wing segment 18-1. The sliding block extends through an opening in the upper surface of the skin segment 20-1 thereof, and is arranged to slide in a lateral, or span-wise direction in an upper, internally opening, laterally extending, C-shaped channel 38-2 contained in the upper portion of the skin 20-2 of the next-adjacent wing segment 18-2.

FIG. 5D illustrates a further embodiment showing a similar sliding block arrangement at the inboard end of the lower surface of the wing segment 18-1, in which another of the sliding blocks 42-1A is coupled to the lower end of the rib 22-1 through an opening in the lower surface of the wing skin segment 20-1, and arranged to slide in a lower, internally opening C-shaped span-wise channel 38-2 of the lower portion of the skin 20-2 of the adjacent wing segment 18-2. It may be seen that the sliding block arrangements of wing segment 18-1 illustrated in FIGS. 5B and 5D, which are all coupled to the associated rib 22-2 located at the inner end of wing segment 18-2 and distributed about its longitudinal periphery, serve to support the inner end of the wing segment 18-1 for span-wise sliding movement relative to and inside of the next-adjacent wing segment 18-2.

FIG. 5C illustrates a further embodiment showing the sliding interface between the outboard end of the next-adjacent wing segment 18-2 and the first wing segment 18-1 above. This outboard end interface, which is the same for all of the wing segments except the outermost wing segment 18-1, comprises differently configured sliding blocks 42-2B and 42-3B that are fixed at the respective outboard ends of the wing segments 18-2 and 18-3 in respective, laterally extending, externally opening, C-shaped channels 40-2 and 40-3 (not seen in FIG. 5C) contained in respective ones of the skins 20-2 and 20-3 (not seen in FIG. 5C) of the corresponding wing segments, and adapted to slide in a span-wise direction in corresponding, laterally extending, externally opening, C-shaped channels 40-1 and 40-2 respectively contained in the respective skins 20-1 and 20-2 of respective ones of the adjacent wing segments 18-1 and 18-2.

It may be generally noted in FIGS. 5A-5D that the externally opening C-channels 40-$i$ are disposed parallel to and in an alternating manner with the internally opening channels 38-$i$ about the longitudinal periphery of the wing segments, and that, unlike the sliding blocks 42-$i$A that couple to the ribs 22-$i$, the ends of the sliding blocks 42-$i$B that slide in corresponding, externally opening C-channels are provided with recirculating balls 44 that circulate in oval tracks to reduce sliding friction during wing retraction and deployment. However, it should be understood that this arrangement is only by way of an example, and that the sliding blocks 42-$i$A can be similarly equipped, or alternatively, that either or both of the sliding blocks 42-$i$A and 42-$i$B can be provided with other known means for reducing sliding-friction between the segments.

Thus, as illustrated in FIGS. 5A-5D, the intermediate wing segment skins 20-$i$ are interlocked at both ends (in a span-wise direction) to a) the corresponding rib 22-$i$ at the inboard end by lower and upper internal sliding blocks 42-$i$A, and b) at the opposite outboard end of the skin by lower and upper external sliding blocks 42-$i$B, and that each of the sliding blocks moves in a respective, corresponding C-channel that is integral to the sandwich structure of an adjacent skin segment 20-$i$.

Figure 6:
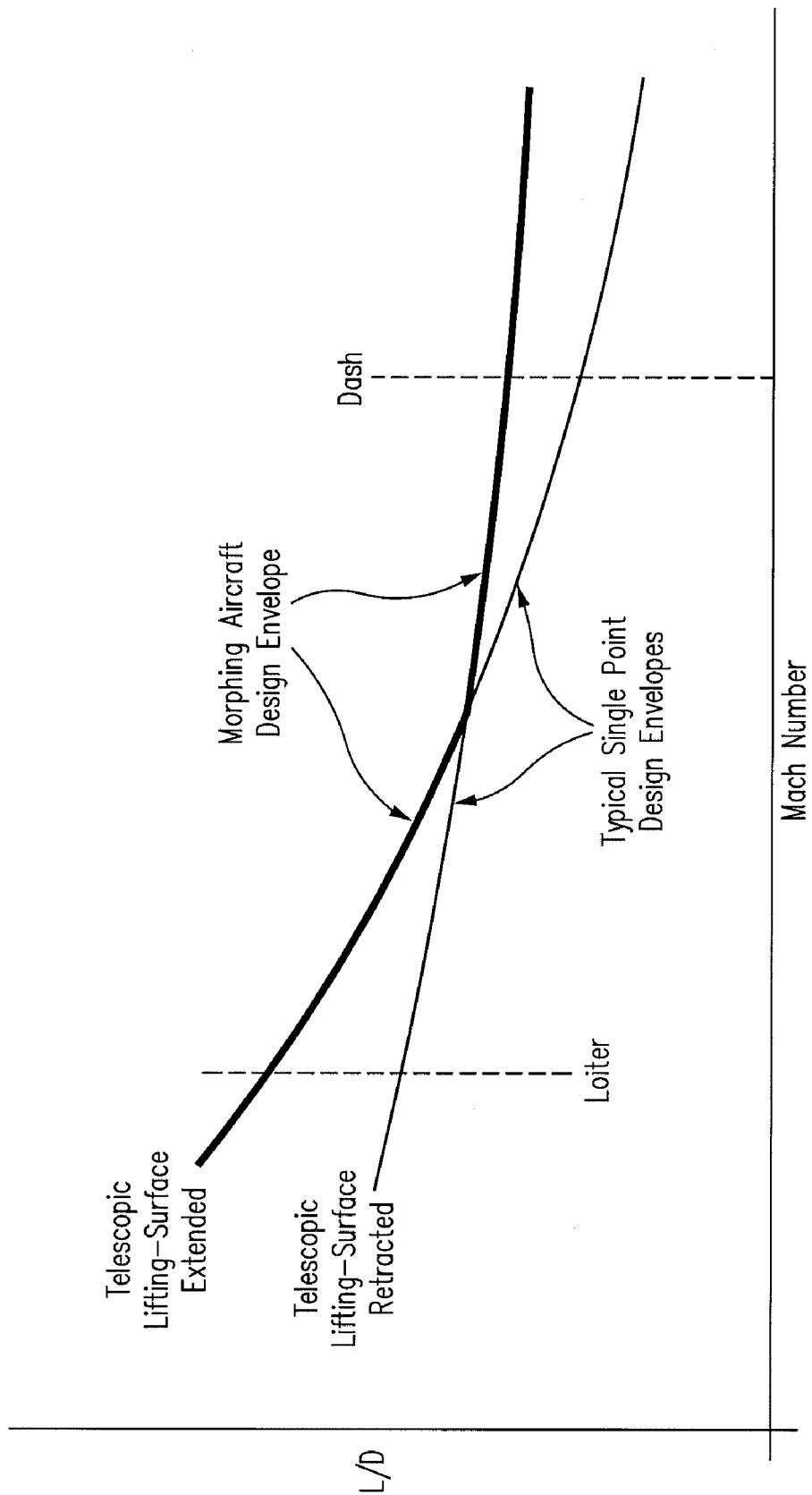
FIG. 6 is a graph of the lift-over-drag (L/D) vs. Mach number design envelope plot of an exemplary embodiment of a lifting body aircraft incorporating a telescopic wing and optimized for two mission requirements, viz., a "loiter" mission, in which the lifting surface is deployed, and a "dash" mission, in which the lifting surface is retracted.

FIG. 6 is a graph illustrating the lift-over-drag (L/D) vs. Mach number design envelope plot of an exemplary embodiment of a lifting body aircraft 10 incorporating a telescopic wing and optimized for two mission requirements, viz., a slow-speed, or "loiter" mission, in which the wing 14 is deployed, and a high-speed, or "dash" mission, in which the lifting surface is retracted, the deployable 14 wing thereby enabling the aircraft 10 to operate in two dramatically different design envelopes. Unlike conventional aircraft configurations that are optimized only for one design envelope (i.e., either a low speed or high speed flight), aircraft incorporating telescopic lifting surfaces can be optimized for both "dash" missions and for "loiter" operations. Thus, an aircraft 10 that is optimized for low operational velocities benefits from high lift-to-drag (L/D) ratios, typically achieved by the provision of a large wing span. However, as illustrated in FIG. 6, at high velocities (i.e., high Mach numbers) the aircraft lifting body 12 (with telescopic lifting surface retracted) generates higher L/D values and better performance than an identical lifting body aircraft with deployed telescopic wing. Thus, the aircraft can be configured while in flight between the two design envelopes, and hence, optimized for both mission requirements, even though the BWB or delta-body of the aircraft is configured to fulfill only the high speed ("dash") requirement.

Figure 7:
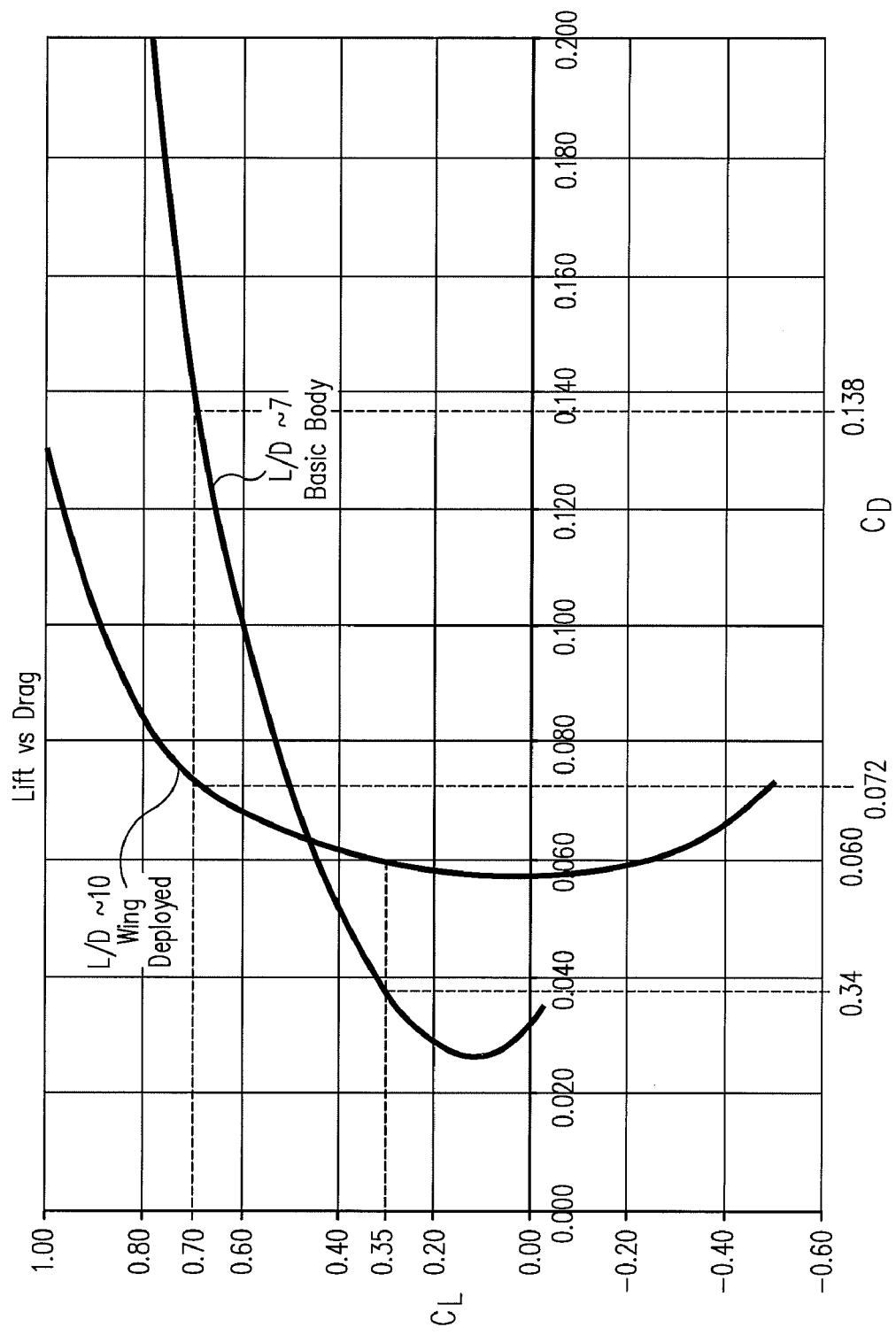
FIG. 7 is a graph of the coefficient of lift ($C_L$) vs. coefficient of drag ($C_D$) characteristics plot of an exemplary embodiment of a lifting body aircraft incorporating a telescopic wing in accordance with the present invention.

FIG. 7 further graphically illustrates the two aerodynamic profiles for an embodiment at a specific angle of attack (6 degrees in this case) that deploys a telescopic wing to enable a transition from a high speed, low lift-to-drag aircraft to a low speed, high lift-to-drag aircraft. As shown in this figure, an embodiment of a lifting body aircraft 10 incorporating a telescopic wing and optimized for two mission requirements has a lower L/D when configured for high speed "dash" mission, e.g., wings retracted, and a higher L/D when configured for a loiter mission, e.g., with wings deployed.

Figure 8:
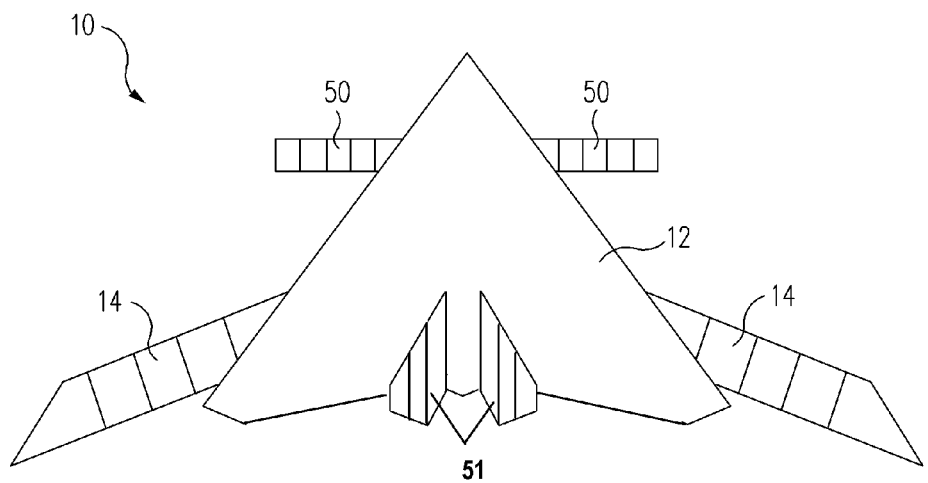
FIG. 8 is a plan view of an exemplary embodiment of a lifting body aircraft incorporating telescopic wings and canards; and, FIG. 9 is a top plan view of an exemplary embodiment of a lifting body aircraft incorporating variable-sweep telescopic wings.

It should be understood that the embodiments of disclosed telescopic lifting surfaces are not limited to telescopic wings. FIG. 8 illustrates a further embodiment showing a morphing aircraft 10 configuration in which the basic high speed lifting body 12 contains stowage chambers for integrating a pair of telescopic wings 14, as well as a pair of canards 50. During a "dash" mission phase, the basic high speed body is utilized, and during a "loiter" mission phase, the telescopic wings 14 and canards 50 are deployed to improve the aerodynamic performance and the control of the aircraft. A further embodiment may also include a telescoping control fin, vertical tail surface or "ruddervator." 51. These deployable telescoping lifting and/or control surfaces favorably impact flight performance and allow for beneficial effects at flight envelope extremes, such as landing and high-g maneuvers.

Figure 9:
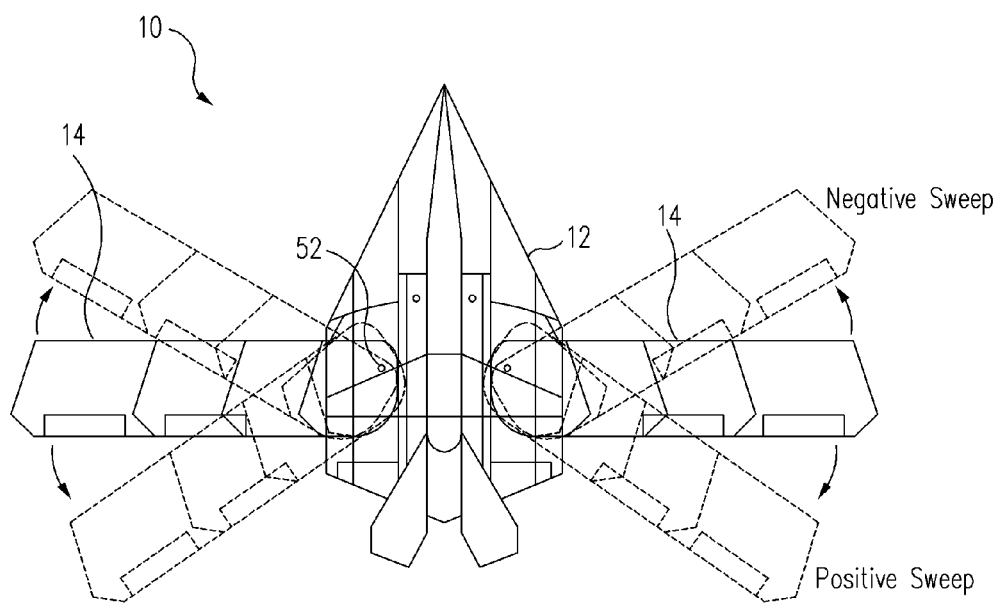

FIG. 9 illustrates another possible embodiment of an aircraft 10 having a lifting body 12 and a pair of "variable sweep" telescopic wings 14. In this aircraft, the high-speed lifting body 12 is utilized during "dash" mission phases, and the telescopic wings 14 are deployed during "loiter" phases, as described above. Additionally, however, the variable sweep capability of the wings enables them to be rotated between forward and an aft sweep angular positions about a pivot, or rotational axis disposed at the root ends of the telescopic wings. This additional adjustment feature enables adjustments in the position of the aircraft's center of lift (CL) relative to the aircraft's center of gravity (CG) so as to optimize aerodynamic conditions during flight.

As those of skill in this art will by now appreciate, many modifications, substitutions and variations can be made in and to the materials, methods and implementation of the telescopic wing morphing aircraft of the present invention without departing from its spirit and scope. In light of this, the scope of the present invention should not be limited to that of the particular embodiments illustrated and described herein, as they are only by way of some examples thereof, but instead, should be fully commensurate with that of the claims appended hereafter and their functional equivalents.

What is claimed is:

1. An aircraft, comprising: a lifting body; a telescopic wing coupled to the lifting body, the wing being deployable between extended and retracted positions relative to the lifting body and configured such that, when disposed in the extended position, the flight characteristics of the aircraft correspond to those of a low-speed, high-lift aircraft, and when disposed in the retracted position, the flight characteristics of the aircraft correspond to those of a high-speed, low-lift aircraft, the wing is disposed entirely within the lifting body, and an outboard end element of the wing blends continuously into an outer mold line of the lifting body; and a mechanism for pivoting the wing about an axis perpendicular to the wing and located at a root end thereof such that a portion of the wing outboard of the axis is sweepable between forward and aft positions.

2. The aircraft of claim 1, wherein the wing comprises a canard to provide lift to the aircraft.

3. The aircraft of claim 1, further comprising a telescopic vertical fin, stabilizer or ruddevator.

4. The aircraft of claim 1, wherein the lifting body comprises a blended wing body (BWB) or a body having a delta shape.

5. The aircraft of claim 1, wherein the wing comprises a plurality of segments having opposite inboard and outboard ends that nest concentrically within one another when the wing is disposed in the retracted position.

6. The aircraft of claim 5, wherein each segment comprises: an outer skin; a rib disposed inside the skin at the inboard end of the segment; a pair of fore and aft spar segments extending laterally between the inboard and outboard ends; and, a mechanism disposed adjacent to at least one of the inboard and outboard ends for slidably supporting the at least one end relative to an adjacent segment.

7. The aircraft of claim 6, wherein respective ones of the fore and aft spar segments nest concentrically within each other when the wing is disposed in the retracted position.

8. The aircraft of claim 6, wherein both the fore and aft spar segments of each wing segment are either rotatable about a lateral axis of the wing segment, or are fixed relative to the wing segment.

9. The aircraft of claim 8, wherein the wing segments containing the rotatable spar segments alternate with the wing segments containing the fixed spar segments.

10. The aircraft of claim 9, further comprising a mechanism for rotating respective pairs of the rotatable fore and aft spar segments such that the fixed pair of the fore and aft spar segments of an adjacent wing segment are urged coaxially toward or away from the adjacent pair of rotatable spar segments.

11. The aircraft of claim 6, wherein the sliding support mechanism comprises a sliding block having an inner end fixedly coupled to the rib of the wing segment and an outer end configured to slide in a laterally extending, inwardly opening, C-shaped channel contained in the skin of an adjacent wing segment.

12. The aircraft of claim 6, wherein the sliding support mechanism comprises a sliding block having an outer end fixed at the outer end of the skin of the wing segment and an inner end configured to slide in a laterally extending, outwardly opening, C-shaped channel contained in the skin of an adjacent wing segment.

\* \* \* \* \*